United States Patent [19]

Park

[11] Patent Number: 5,207,713

[45] Date of Patent: May 4, 1993

[54] SAFETY COVER FOR STEERING WHEEL

[75] Inventor: Kwang J. Park, Seoul, Rep. of Korea

[73] Assignee: Yohan Electronics Co., Ltd., Seoul, Rep. of Korea

[21] Appl. No.: 811,689

[22] Filed: Dec. 23, 1991

[30] Foreign Application Priority Data

Dec. 26, 1990 [KR] Rep. of Korea ............... 20998/1990

[51] Int. Cl.[5] ............................................. B62D 1/06
[52] U.S. Cl. ........................................ 74/558; 280/750
[58] Field of Search ................... 74/558, 558.5, 552; 280/750, 751

[56] References Cited

U.S. PATENT DOCUMENTS

| | | | |
|---|---|---|---|
| 2,227,579 | 1/1941 | Harley | 74/558 |
| 2,270,902 | 1/1942 | Rubisson | 74/559 X |
| 2,946,869 | 7/1960 | Parks et al. | 74/558.5 |
| 3,945,416 | 3/1976 | Rim | 74/558 X |
| 4,108,020 | 8/1978 | Fleischmann et al. | 74/558 |
| 4,441,382 | 4/1984 | Snooks | 74/558 |
| 4,575,117 | 3/1986 | Uchida | 74/558.5 X |
| 4,584,900 | 4/1986 | Masuda | 74/558 X |
| 4,782,872 | 11/1988 | Moschini | 74/558 X |
| 4,824,873 | 4/1989 | Ushida et al. | 74/558 X |
| 4,920,822 | 5/1990 | Abiko | 74/558 X |

Primary Examiner—Rodney H. Bonck
Assistant Examiner—Andrea Pitts
Attorney, Agent, or Firm—Laubscher & Laubscher

[57] ABSTRACT

A safety cover for use with the steering wheel of an automobile comprising an impact reducing section having an elastic partition wall and a cavity formed by the elastic partition within which an impact reducing material such as air, liquid, or a solid elastic body is filled, and a mounting section for mounting the impact reducing section to the steering wheel. The safety cover is capable of reducing an impact from the steering wheel which may be applied to a human body in case of a collision of the automobiles, and for absorbing car vibrations and thereby produce a good handling sensation.

15 Claims, 15 Drawing Sheets

SAFETY COVER FOR STEERING WHEEL

BACKGROUND OF THE INVENTION

1. Field of the Invention

The present invention relates to a safety cover for use with the steering wheel of automobiles, and more particularly to a safety cover for a steering wheel which is detachably mounted around the steering wheel and is capable of absorbing and reducing an impact which may be applied to a human body from the steering wheel in case of an automobile collision accident.

2. Description of the Prior Art

In general, it is well known that in case that a colliding accident occurs, the driver's chest and abdominal regions are projected strongly against the steering wheel thereby resulting in a fatal damage to the human body.

Recently, various kinds of safety systems have been proposed for protecting the human body from traffic accidents, such as a flexible shaft for a steering wheel which is bendable in case of a collision, or an air bag which is mounted within the wheel shaft or an upper portion of the car roof so as to be blown up in case of a collision.

In the installation of such devices, there has been the disadvantage that since a complex design change is required, they are not applicable to existing automobiles and also they do not operate in case of a slight collision, or from the impact sensing mechanism being out of order. On the other hand, Korean U.M. Publication No. 89-3848 discloses a pneumatic steering wheel which is structured such that a handgrip and a spoke of the steering wheel are made of rubber and the interior thereof is made into a hollow body so as to be filled with air. This type of the steering wheel is bendable at its handgrip and spoke portions in case of a collision accident, thereby absorbing an impact.

However, such as known steering wheel has the disadvantage that since it is made of rubber, it is unstable in use, and further, that when the pneumatic steering wheel is applied to existing automobiles, the existing steering wheel has to be totally replaced.

SUMMARY OF THE INVENTION

It is, therefore, an object of the present invention to provide a safety cover for use with the steering wheel of an automobile, which is easily attached to the steering wheel of existing cars and is capable of reducing an impact by the operator with the steering wheel.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention relates to a safety cover for use with the steering wheel of an automobile which generally comprises an impact reducing section adapted for wrapping around the outer circumferential surface of the handgrip portion of a steering wheel, and a fixing section for connecting the impact reducing section to the steering wheel.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
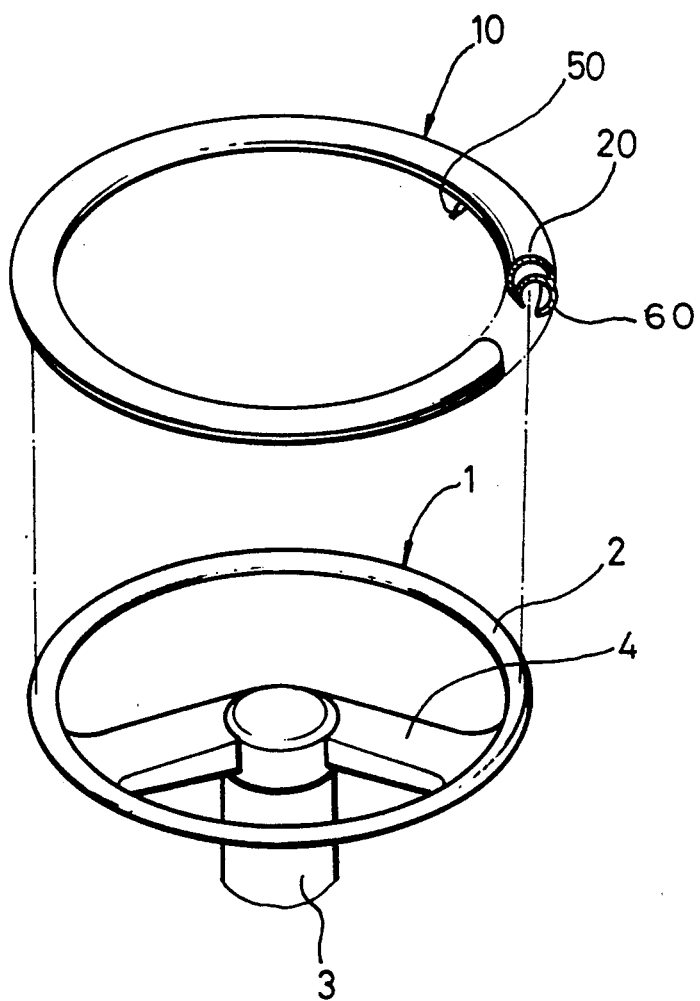
FIG. 1 is a partially sectioned perspective view of a safety cover according to an embodiment of the present invention.

Referring now in detail to the drawings for the purpose of illustrating preferred embodiments of the present invention, the safety cover 10 for use in connection with a steering wheel of automobiles as shown in FIGS. 1 and 2, comprises an impact reducing section 20 adapted for wrapping around an outer circumferential surface of the handgrip portion 2 of a steering wheel 1, and a mounting section 60 for mounting the impact reducing section 20 upon the handgrip portion 2 of the steering wheel 1.

Figure 2A:
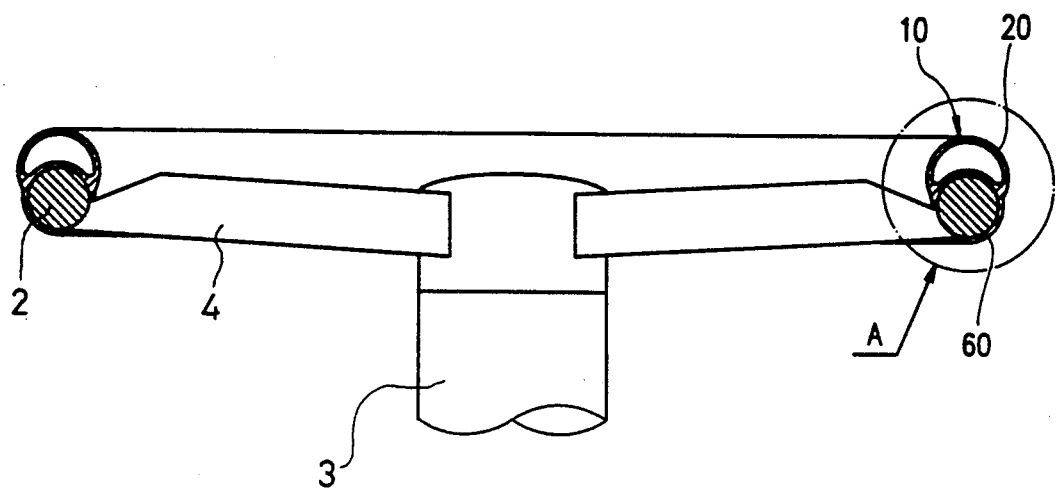
FIG. 2A is a longitudinal sectional view showing the safety cover of FIG. 1 mounted on a steering wheel.
Figure 2B:
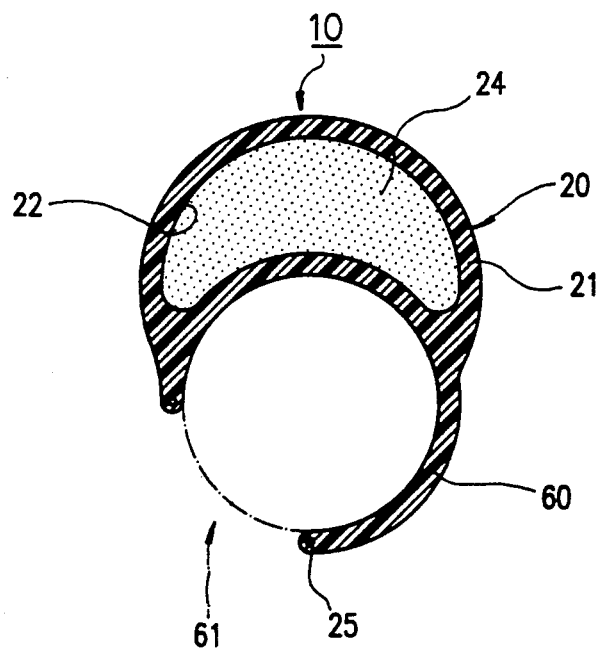
FIGS. 2B and 2C are enlarged views of the portion "A" of FIG. 2A, and a modification thereof, respectively.
Figure 2C:
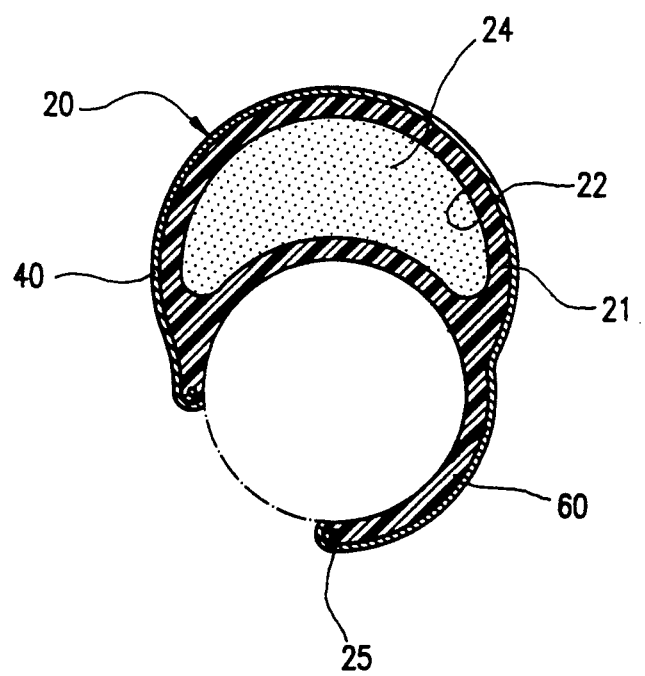

In this embodiment, the safety cover 10 may be formed from a flexible and impact reducing material such as rubber, synthetic resin or the like, and has a sufficient width to extend around the outer circumferential surface of the steering wheel 1. The safety cover 10 also may be covered by an outer covering layer 40, such as cloth, leather sheet or the like, as shown in FIG. 2C.

Adjacent the end edges of an opening 61 provided in the mounting section 60, a wire 25 is embedded to prevent the mounting section 60 assembled to the handgrip portion 2 of the steering wheel 1 from being separated. Alternatively, a number of holes may be provided at the end edges of the opening 61 through which a binding string is inserted.

The impact reducing section 20 includes an impact reducing partition 21 24, which cavity is formed integrally with the mounting section 60, and a cavity 22 for containing therein an impact reducing material 24, which cavity is formed within the partition 21.

Fluid is supplied to cavity 22 via a valve 50, such as that used on a bicycle inner tube or on a swimming tube.

In FIGS. 1 and 2, reference numeral 3 is a steering shaft, and spokes 4 are provided for connecting the steering shaft 3 with the handgrip 2.

In mounting the safety cover of the present invention upon the steering wheel 1, the opening 61 of the mounting section 60 is opened and fitted around the outer surface of the handgrip 2 of the steering wheel 1. In this state, an impact reducing material 24 such as air or a liquidified material is introduced to the cavity 22 of the impact reducing section 20 through the inlet 50 so that the cover body 10 is firmly mounted on to the steering wheel 1, as shown in FIGS. 2A and 2B. Such a coupling condition can be firmly maintained by the expansive force of the impact reducing material which is filled in the cavity 22, or the binding force of the wire 25 or a binding string.

The safety cover coupled to the steering wheel 1 as mentioned above faces toward the driver, so that even though a collision accident occurs in the operation of the car, the chest and abdominal portion of the driver is projected against the impact reducing section 20 of the safety cover, thereby reducing and absorbing the impact, resulting in preventing the human body from being subjected to fatal damage.

On the other hand, in ordinary operation of the car, since the impact reducing section 20 having a proper cushion is gripped by the driver's hands, the operation feeling becomes good and also a slight vibration which may be produced due to a rough road surface condition or an engine noise is avoided.

Furthermore, the safety cover of the present invention is easily coupled to or separated from the steering wheel so that any possible substitution may be executed conveniently.

Figure 3A:
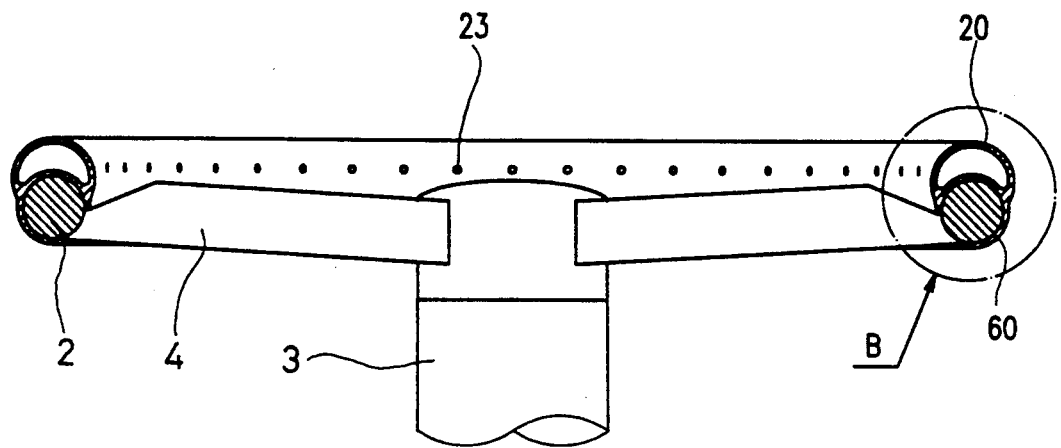
FIG. 3A is a longitudinal sectional view of the safety cover according to another embodiment of the present invention.
Figure 3B:
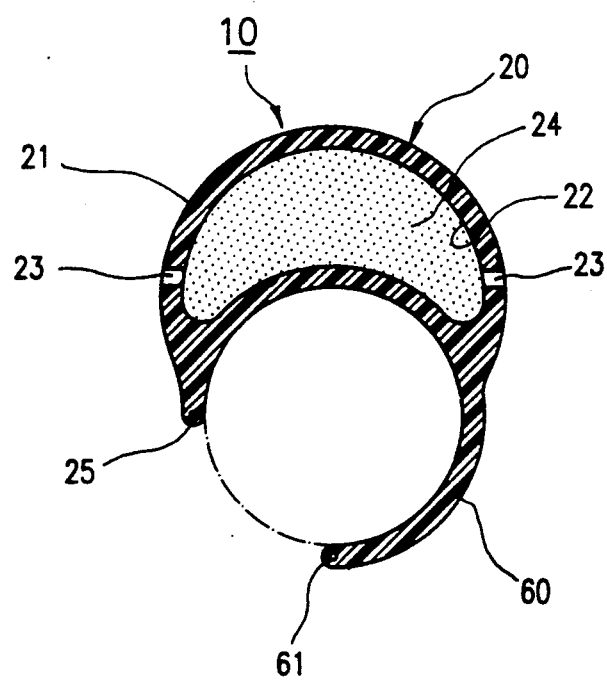
FIG. 3B is an enlarged view of the portion "B" of FIG. 3A.

Referring to FIGS. 3A and 3B, the safety cover of another embodiment of the present invention is structured such that the impact reducing section 20 is provided with a number of air holes 23 so that the air filled within the cavity 22 flows out through the air holes 23 in case that any impact is applied thereto. In this embodiment, the construction is somewhat simpler than that of the first embodiment, while the operational effect for reducing impact is the same as that in the first embodiment.

Figure 4:
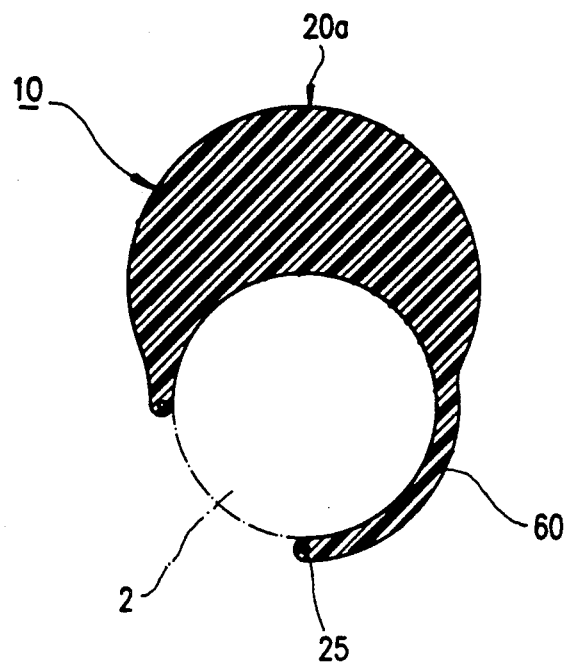
FIGS. 4-6 are longitudinal sectional views of the safety cover according to still another embodiment of the present invention.

FIG. 4 shows a safety cover according to still another embodiment of the present invention in which the impact reducing section 20a is solid and totally filled with the same material as that of the mounting section. The safety cover of this embodiment also has the same operational effect as that in the first embodiment of the invention.

Figure 5:
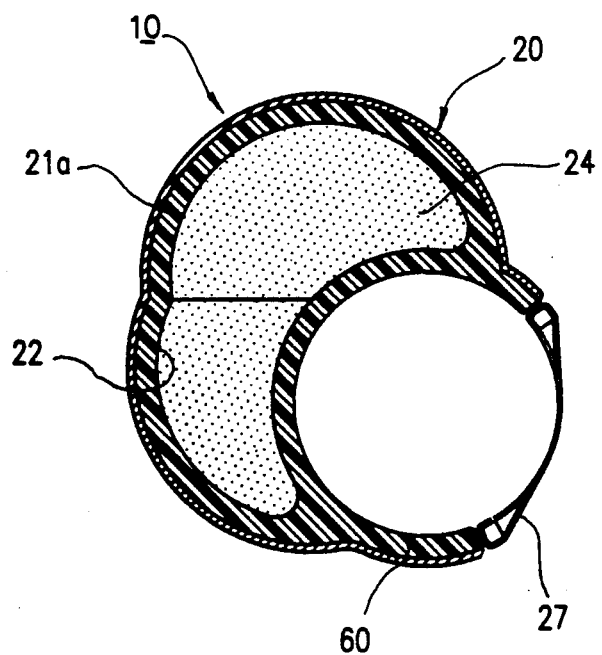

FIG. 5 shows a safety cover according to a still further embodiment of the present invention in which the partion 21 of the impact reducing section 20 has a double-structured partition 21a of which the outer surface is inflated in stepwise so that an impact reducing area and amount can be increased. The mounting section 60 includes at both end edges of the opening 61 a binding string 27 for binding together the opening edges.

Figure 6:
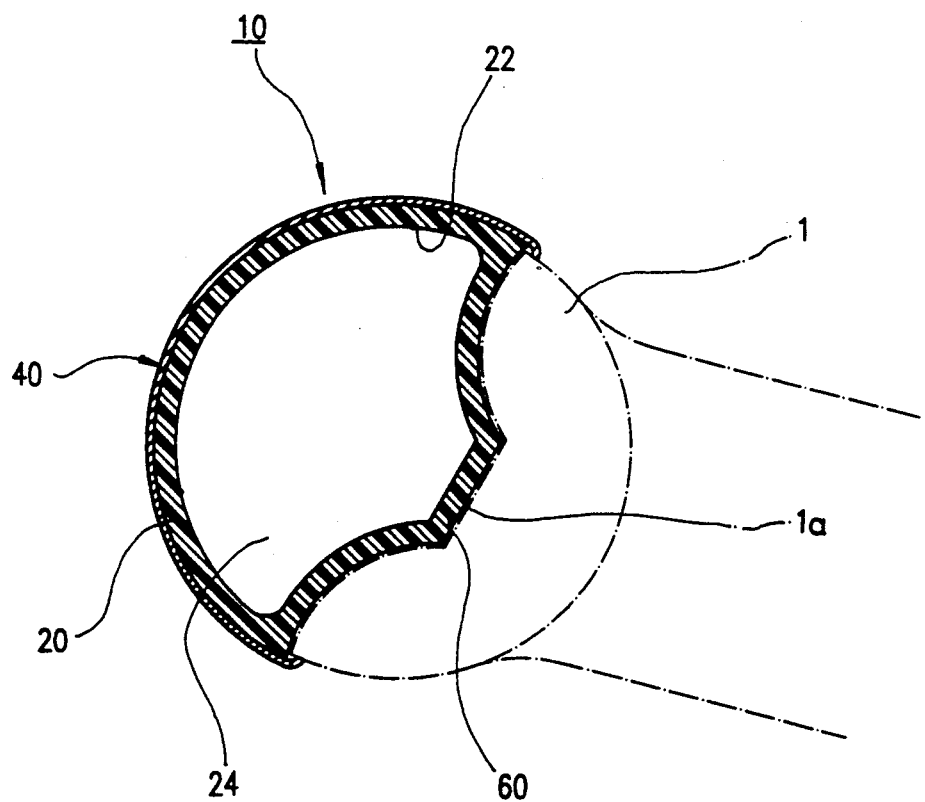

FIG. 6 shows a safety cover according to still further embodiment of the present invention in which the impact reducing section 20 and the mounting section 60 are formed integrally into an air tube type, the fixing section 60 is inwardly protruded toward the inner side of the impact reducing section 20, and an impact reducing material 24 which is selected from air, liquid or an elastic solid body is filled in the cavity 22.

In this embodiment, the inwardly protruded fixing section 60 is inserted in a recess 1a which is formed at the outer peripheral surface of the steering wheel 1 so that the safety cover 10 is mounted thereto, while a covering 40 such as a leather sheet may be covered on the outer circumferential surface of the impact reducing section 20 of the handle cover 10 for a smooth touch, as shown in FIG. 6 and FIG. 2c, and also both the end edges of the covering 40 may be tied up by means of a string 27 for a tight coupling, as shown in FIG. 5.

According to this embodiment, the safety cover 10 has a simple structure and shape and the basic shape of the steering wheel 1, that is, the original round sectional shape can be maintained without any modification.

Figure 7:
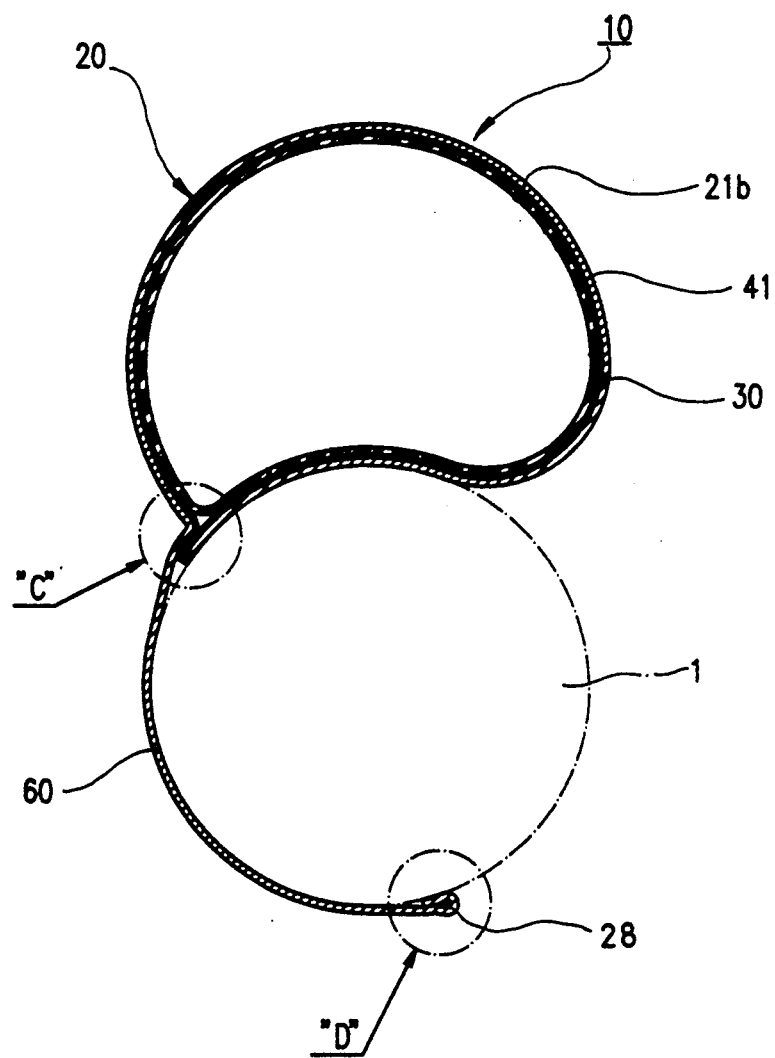
FIG. 7 is a longitudinal sectional view of the safety cover according to a still further embodiment of the invention.
Figure 8:
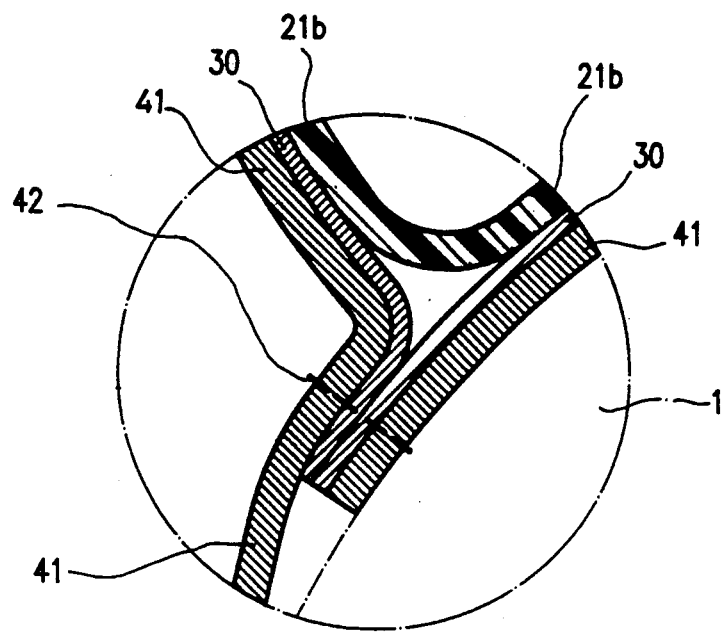
FIG. 8 is an enlarged sectional view of the portion "C" of FIG. 7.
Figure 9:
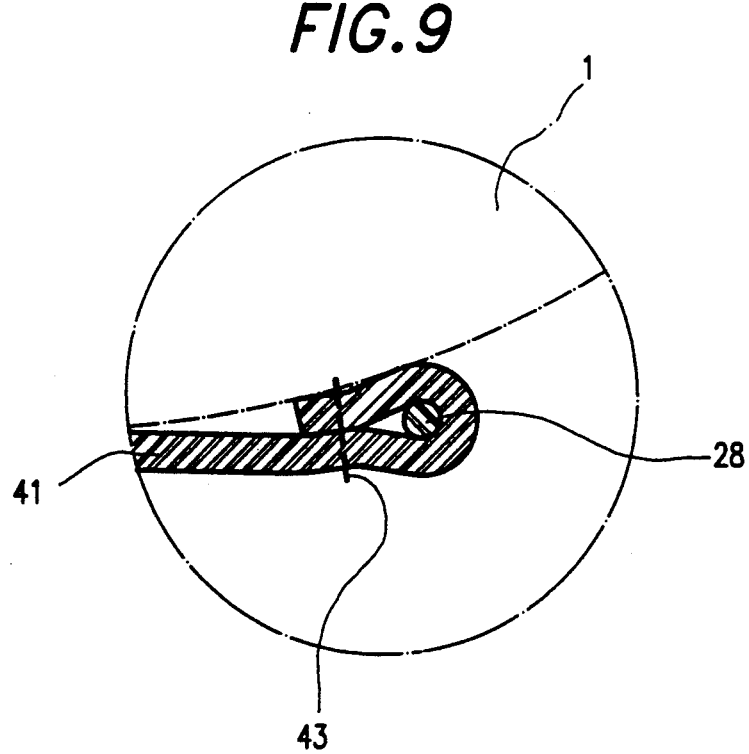
FIG. 9 is an enlarged sectional view of the portion "D" of FIG. 7.

FIGS. 7, 8 and 9 illustrate the safety cover according to a still further embodiment of the present invention, in which the impact reducing section 20 of the safety cover 10 includes an air tube 21b.

In this embodiment, a reinforced cloth 30 is wrapped around the air tube 21b so that the air tube 21b is uniformly inflated and further a leather sheet 41 is wrapped around the outer surface of the cloth 30 and a string 28 is provided at the lower extended end edge of the leather sheet 41 to tie up the steering wheel 1 for the impact reducing section 20, and a more pleasing touch.

In manafacturing the safety cover 10 according to this embodiment, the reinforcing cloth 30 is adhered to the upper inner surface of the leather sheet 41 by means of an adhesive agent or a double-faced adhesive tape and then the leather sheet 41 is wrapped around the air tube 21b, thereafter the lower end edge of the leather sheet 41 and the middle portion thereof are sewn together in a state that a string 28 is inserted therein with both free ends of the string 28 being exposed outwardly. In the drawings, reference numerals 42 and 43 denote sewing lines.

In assembling the safety cover 10 according to this embodiment, an impact reducing material such as air is filled in the air tube 21b of the impact reducing section 20 and the impact reducing section 20 is fitted on the steering wheel 1. In this state, the lower hem of the leather sheet 41 is wrapped partially around the outer circumferential surface of the steering wheel 1 so that the string 28 is positioned at the lower inner side of the steering wheel 1, and then both free ends of the string 28 are tightly tied together.

In accordance with this embodiment, the safety cover 10 has the effect that the impact reducing section 20 is inflated uniformly and is capable of being assembled easily and securely to the steering wheel 1 and also has a pleasant touch in use.

Figure 10:
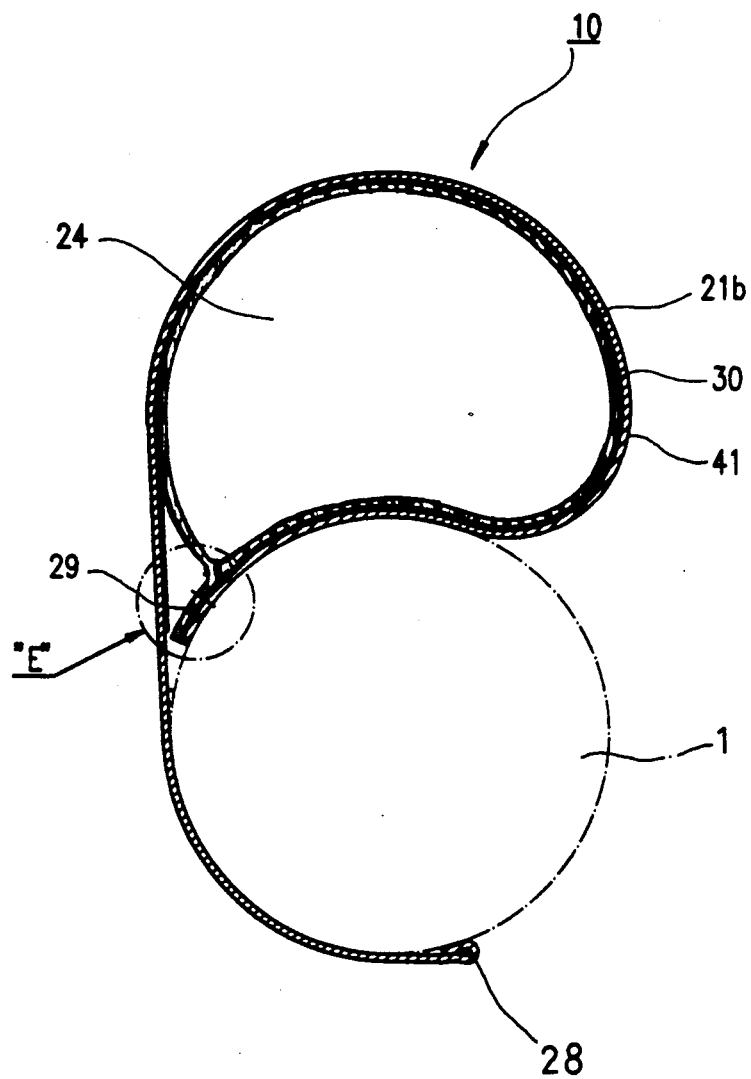
FIG. 10 is a longitudinal sectional view of the safety cover according to a still further embodiment of the present invention.
Figure 11:
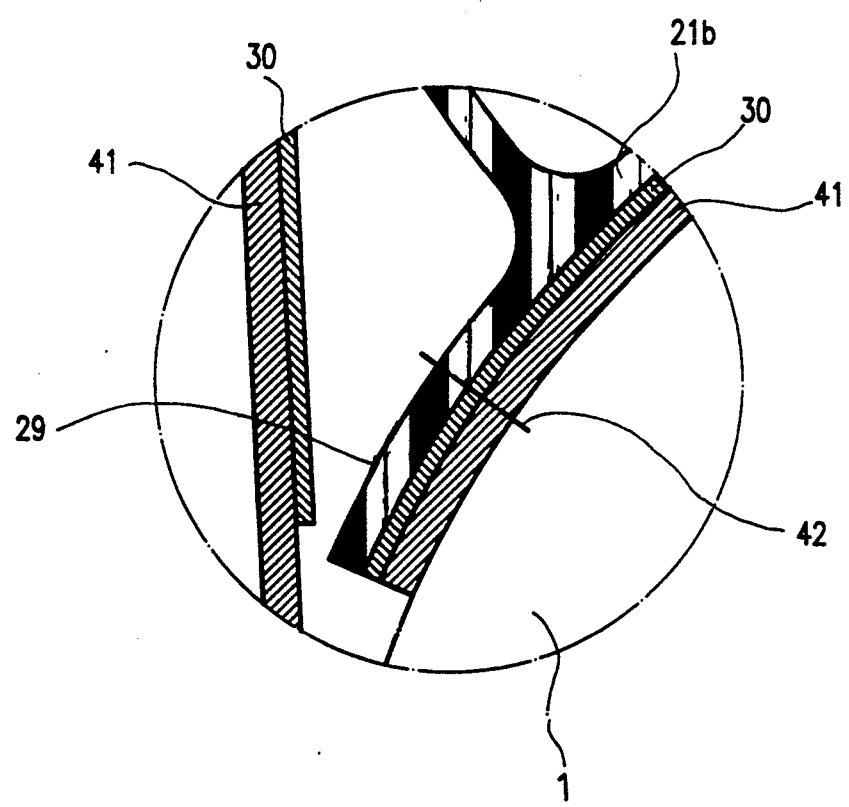
FIG. 11 is an enlarged sectional view of the portion "E" of FIG. 10.

FIGS. 10 and 11 illustrate the safety cover according to still further embodiment of the present invention which is designed to avoid the phenomenon that the sewing line 42 is exposed to the outside and the sewing line portion 42 is sunken so that the appearance does not look good when the safety cover 10 is assembled to the steering wheel 1. For this purpose, the safety cover 10 of this embodiment is characterized in that the air tube 21b of the impact reducing section 20 is provided with a wing portion 29 of a predetermined width to which an upper edge portion of the leather sheet 41 is stiched, as can be seen in the drawings.

Accordingly, when the safety cover 10 of this embodiment is assembled to the steering wheel 1, the leather sheet 41 does not sunken at the position where the sewing line 44 is located and thus spreaded in plain so that the safety cover 10 and the handgrip portion 2 of the steering wheel 1 look like a one piece product with a compact appearance.

Figure 12:
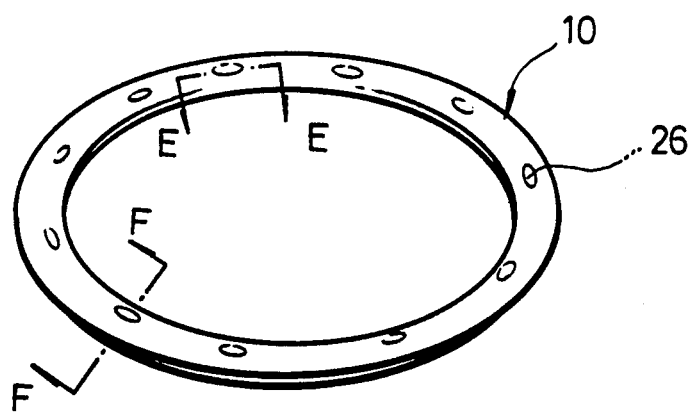
FIG. 12 is longitudinal sectional view of the safety cover according to a still further embodiment of the present invention.
Figure 13:
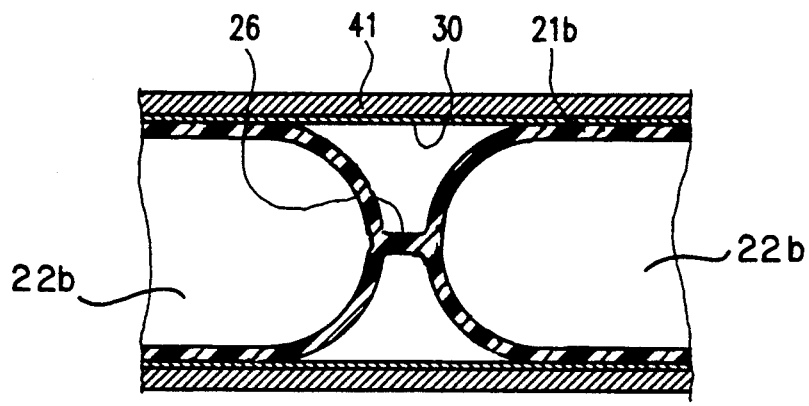
FIG. 13 is a sectional view taken along the line E—E of FIG. 12.
Figure 14:
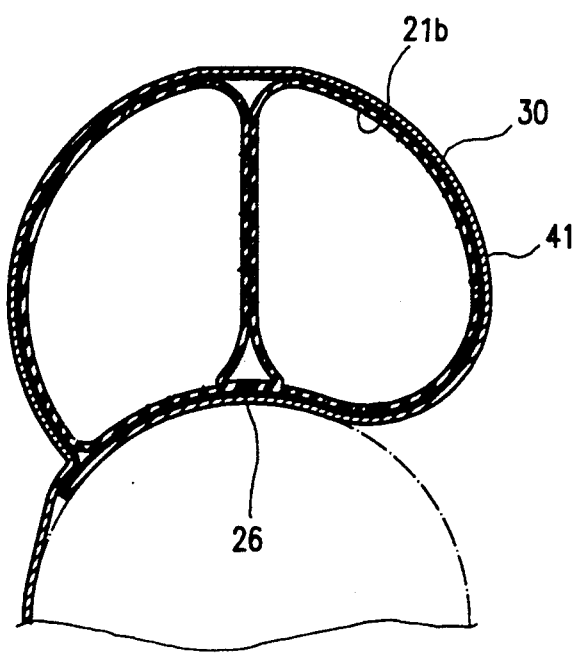
FIG. 14 is a sectional view taken along the line F—F of FIG. 12.

FIGS. 12, 13 and 14 illustrate the safety cover according to a still further embodiment of the present invention, in which the air tube 21b is subjected to a high frequency energy bonding between its upper and lower surfaces so as to define a plurality of circumferentially spaced air pockets 24a. This air tube 21b can be used instead of the air tube as shown in FIG. 12. This kind of air tube 21b has the effect that in case a certain portion of the air tube 21b is subjected to an impact, an impact reducing material such as air contained in the air tube 21b does not flow smoothly in another air pocket due to the high frequency energy bonded wall portion, so that the phenomenon is avoided that the impact-applied portion looses its elasticity more quickly than other portions, thus strengthening the impact reducing effect. In FIGS. 12 to 14, reference numeral 26 designates a connecting wall portion formed by virtue of the high-frequency energy bonding.

Figure 15:
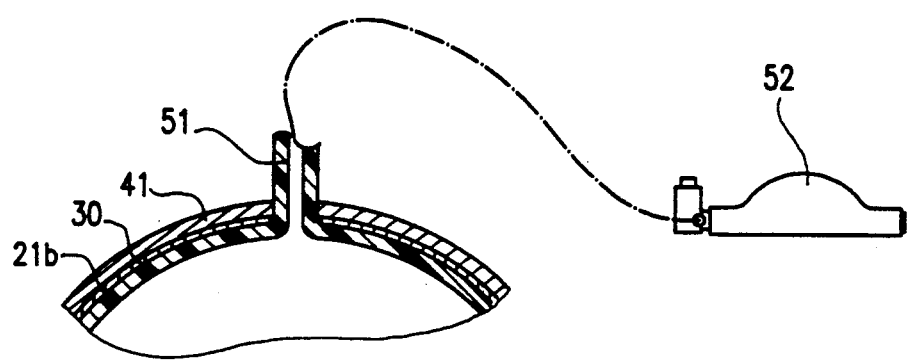
FIG. 15 is a perspective view of an alterative embodiment of an air inlet for the safety cover.
Figure 17:
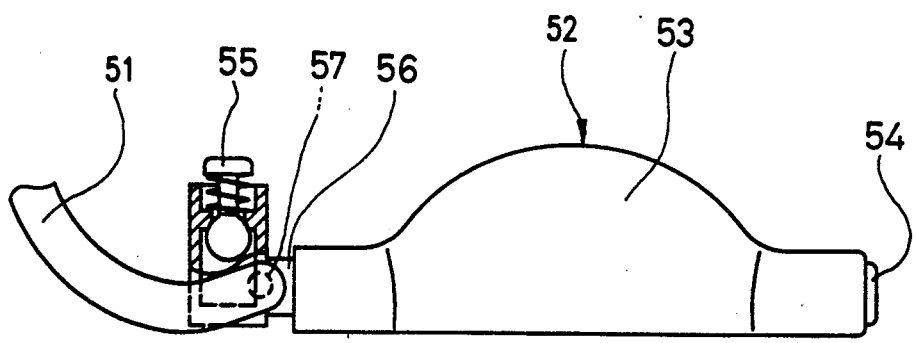
FIG. 17 is a sectional view of the pump of FIG. 16.
Figure 16:
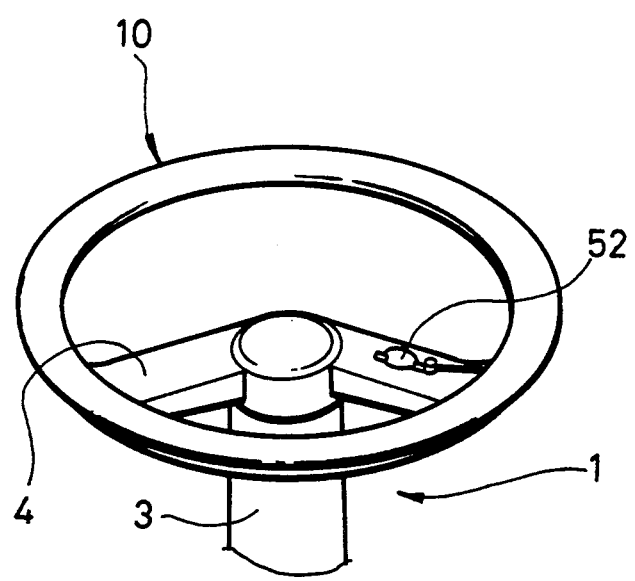
FIG. 16 is a detailed enlarged view of FIG. 15.

FIGS. 15 and 16 illustrate a modified example of the inlet portion of the safety cover 10, and FIG. 17 illustrates the pump of FIG. 16. As shown in FIGS. 15 to 17, a hose 51 having a predetermined length is connected at the one end with the air tube 21b of the safety cover 10, and a pump 52 is connected with the other end of the hose 51. The pump 52 may be attached to a proper place such as a spoke portion 4 of the steering wheel 1, as shown in FIG. 16.

The pump 52 includes an elastic body 53, a one-way inlet valve 54 provided at one end of the body 53, a check valve 55 provided at the other end of the body 53, and a discharging opening 57 to which the hose 51 is connected, as shown in FIG. 17. This kind of the pump 52 is capable of executing a pumping operation by being pressed repeatedly at its elastic body 53 and upon pressing the check valve 55, the air contained in the air tube 21b is discharged.

By virtue of the pump 52, it is possible to fill the air within the air tube 21b, as desired, in the state that the safety cover 10 is assembled to the steering wheel 1, as shown in FIG. 15.

Figure 18:
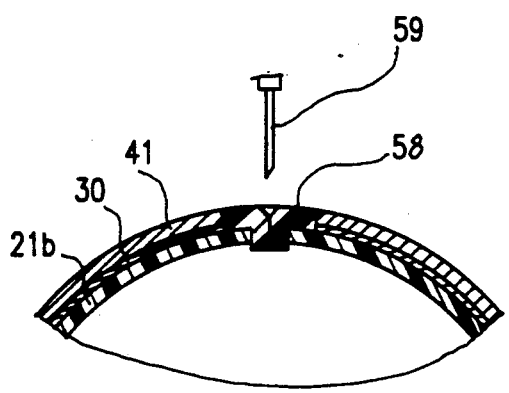
FIG. 18 is a sectional view of another alterative embodiment of the air inlet for the safety cover.

FIG. 18 illustrates another modified example of the inlet portion of the air tube, in which a rubber valve 58 is attached to the inner surface of the air tube 21b, whose inlet side is slightly exposed outwardly through which air is blown up by means of an injection needle.

Also, the pump 52, as shown in FIG. 17, may be utilized to blow up the air into the air tube 21b of the safety cover 10 with the inlet structure, as shown in FIG. 18 by use of a connecting needle 59. That is, the connecting needle 59 is pierced into the rubber valve 58 and the other side end of the connecting needle 59 is connected to the discharge opening 57 of the pump 52.

As described above in detail, the present invention provides the effect that it is capable of being applied easily and compatibly to the steering wheel irrespective of the type of vehicles and preventing fatal damage in case of a collision accident. Also, it affords a good steering wheel feel by absorbing the vibration which is produced by the road surface condition and also provides a pleasant touch.

While the preferred embodiments of the present invention have been disclosed hereinbefore, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A safety cover adapted for use with a steering wheel having a generally circular handgrip portion, comprising:
   (a) an annular impact reducing portion (20) adapted for concentric arrangement about said handgrip portion; and
   (b) a mounting portion (60) operable to mount said impact reducing portion to said handgrip portion;
   (c) said impact reducing portion including a partition wall portion (21) integral with said mounting portion, said partition wall portion containing a chamber (22) for receiving an impact reducing material (24).

2. A safety cover as defined in claim 1, wherein said impact reducing material is air.

3. A safety cover as defined in claim 1, wherein said impact reducing material is a liquid.

4. A safety cover as defined in claim 1, wherein said impact reducing material is a solid elastic material.

5. A safety cover as defined in claim 1, wherein said mounting portion is annular and contains an annular groove for receiving said steering wheel handgrip portion; and further including mounting wire means (25) imbedded within the edges of, and extending parallel with, said groove.

6. A safety cover as defined in claim 1, and further wherein said mounting portion is integral with said impact reducing portion and includes an annular protruding portion that extends within a corresponding recess (1a) contained in said steering wheel.

7. A safety cover as defined in claim 6, and further including an outer leather sheet cover layer arranged concentrically about, and adhesively bonded to, said impact reducing portion, and string means extending around said steering wheel for connecting together the edges of said leather sheet cover layer, thereby to retain said safety cover on the steering wheel.

8. A safety cover as defined in claim 1, wherein said impact reducing partition wall portion includes;
   (1) an annular air tube (21b);
   (2) a layer of reinforcing cloth (30) arranged around the circumference of said air tube; and
   (3) a layer of leather (41) arranged around the circumference of said cloth layer.

9. A safety cover as defined in claim 8, and further wherein said leather layer is adhesively bonded to said cloth layer and includes an end portion connected by a line of sewing (42) with a mid portion thereof.

10. A safety cover as defined in claim 8, wherein said layer of leather is sewn at one edge by a line of sewing (42) with a wing portion (20) of said air tube, said leather layer extending circumferentially around said air tube and partially around the circumference of said steering wheel handgrip portion, and further including a string (28) mounted in the other edge portion of said leather layer, the ends of said string being exposed.

11. A safety cover as defined in claim 8, and further wherein circumferentially spaced portions of said air tube are bonded together by high frequency energy to define a plurality of independent air pockets 22b.

12. A safety cover as defined in claim 1, wherein said mounting portion includes:
   (1) a layer of reinforcing cloth (30) extending concentrically about said partition wall portion;
   (2) a layer of leather (41) wrapped around said partition wall portion and including a hem portion extending partially around the steering wheel handgrip a hem portion extending partially around the steering wheel handgrip portion, thereby to define said mounting portion; and
   (3) a string element (28) mounted on the free edge of said leather layer hem portion for tieing said leather layer to the steering wheel.

13. A safety cover as defined in claim 1, and further including means for inflating said chamber with air, including:
   (1) an air pump (52); and
   (2) an air hose (51) connecting said air pump with said air tube.

14. A safety cover as defined in claim 13, wherein said inflating means further includes an air valve (58) connected with said air tube, and an injecting needle (59) connecting said air hose with said air tube via said air valve.

15. A safety cover as defined in claim 1, wherein said partition wall contains a plurality of air holes (23).

* * * * *